(12) United States Patent
Aragane et al.

(10) Patent No.: US 6,579,641 B2
(45) Date of Patent: Jun. 17, 2003

(54) BATTERY AND PROCESS FOR PREPARING THE SAME

(75) Inventors: Jun Aragane, Chiyoda-ku (JP); Makiko Kise, Chiyoda-ku (JP); Syoji Yoshioka, Chiyoda-ku (JP); Shigeru Aihara, Chiyoda-ku (JP); Daigo Takemura, Chiyoda-ku (JP); Hisashi Shiota, Chiyoda-ku (JP); Takashi Nishimura, Chiyoda-ku (JP); Hiroaki Urushibata, Chiyoda-ku (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 101 days.

(21) Appl. No.: 09/741,801

(22) Filed: Dec. 22, 2000

(65) Prior Publication Data

US 2001/0049050 A1 Dec. 6, 2001

Related U.S. Application Data

(63) Continuation of application No. PCT/JP98/02855, filed on Jun. 25, 1998.

(51) Int. Cl.[7] ........................... H01M 10/50; H01M 4/62

(52) U.S. Cl. .......................... 429/62; 429/232; 429/217

(58) Field of Search ............................... 429/210, 212, 429/217, 218.1, 232, 62, 90, 126; 252/182.1, 511

(56) References Cited

U.S. PATENT DOCUMENTS

| 3,901,960 | A | * | 8/1975 | Holloway et al. | 264/104 |
| 5,759,714 | A | * | 6/1998 | Matsufuji et al. | 429/194 |
| 6,306,540 | B1 | | 10/2001 | Hiroi et al. | |

FOREIGN PATENT DOCUMENTS

| JP | 61-074257 | 4/1986 |
| JP | 1-197963 | 8/1989 |
| JP | 4-058455 | 2/1992 |
| JP | 5-074493 | 3/1993 |
| JP | 6-231749 | 8/1994 |
| JP | 8-306354 | 11/1996 |
| JP | 9-213305 | 8/1997 |
| JP | 10-106516 | 4/1998 |
| JP | 10-241665 | 9/1998 |

OTHER PUBLICATIONS

U.S. patent application Ser. No. 09/485,692, filed Feb. 25, 2000, pending.
U.S. patent application Ser. No. 09/485,684, filed Feb. 25, 2000, pending.
U.S. patent application Ser. No. 09/622,847, filed Feb. 12, 2001, pending.
U.S. patent application Ser. No. 09/741,801, filed Dec. 22, 2000, pending.
U.S. patent application Ser. No. 09/742,074, filed Dec. 22, 2000, pending.
U.S. patent application Ser. No. 09/742,071, filed Dec. 22, 2000, pending.

(List continued on next page.)

*Primary Examiner*—Stephen Kalafut
*Assistant Examiner*—Raymond Alejandro
(74) *Attorney, Agent, or Firm*—Oblon, Spivak, McClelland, Maier & Neustadt, P.C.

(57) ABSTRACT

A battery with an active material layer 6 having an active material 8, an electronically conductive material 9 contacted to the active material 8, and an electrolytic layer 3 jointed with the active material layer 6, wherein the electronically conductive material 9 comprises an electrically conductive filler and a resin having a predetermined thermal melting temperature T1, and has a Positive Temperature Coefficient (PTC) such that resistance of the electrically conductive material increases with temperature, and wherein the active material layer 6 and the electrolytic layer 3 are laminated and are jointed together by heating the resin to a predetermined thermal treatment temperature T2.

10 Claims, 6 Drawing Sheets

OTHER PUBLICATIONS

U.S. patent application Ser. No. 09/742,076, filed Dec. 22, 2000, pending.
U.S. patent application Ser. No. 09/742,075, filed Dec. 22, 2000, pending.
U.S. patent application Ser. No. 10/116,029, filed Dec. 5, 2002, pending.

U.S. patent application Ser. No. 09/485,685, filed Feb. 25, 2000, allowed

U.S. patent application Ser. No. 09/485,693, filed Feb. 25, 2000, allowed

* cited by examiner

BATTERY AND PROCESS FOR PREPARING THE SAME

This application is a continuation of PCT/JP98/02855 filed on Jun. 25, 1998.

TECHNICAL FIELD

The present invention relates to a battery and a method for preparing the same. More particularly, the present invention relates to a battery, which has safety ensured by controlling temperature rise caused by short-circuit or the like and has improved battery characteristics such as discharge load characteristics and to a process for preparing the same.

BACKGROUND ART

Recently, with development in electronic appliances, high leveling of capacity and output density of a battery used as a power source is being advanced. As a battery which can satisfy these requirements, attention is paid to a lithium ion secondary battery. The lithium ion secondary battery has an advantageous effect that energy density is high, while a sufficient counterplan for safety is required because a non-aqueous electrolytic solution is used.

As a counterplan for safety it has been conventionally suggested to incorporate a safety valve which releases increased internal pressure, or a PTC device which increases resistance in accordance with the heat generated from external short circuit to break an electric current.

For example, as disclosed in Japanese Unexamined Patent Publication No. 328278/1992, there is known a method for attaching a safety valve and a PTC device to the positive electrode cap of a cylindrical battery. However, when the safety valve is operated, water in air may invade into a battery to react with lithium in the negative electrode and there is a fear of an exothermic reaction.

On the other hand, the PTC device successively breaks external short-circuit without causing any troubles. As a safety component running firstly at the emergency of the battery, the PTC device can be designed to run when the battery reaches at least 90° C. due to external short circuit.

Since the conventional lithium secondary battery has the construction mentioned above, there exist the following problems.

At occurrence of short-circuit and temperature rise inside the lithium secondary battery, increase of the short-circuit current can not be controlled in a conventional lithium secondary battery.

When the short-circuit inside the lithium secondary battery increases a temperature, a polyethylene or polypropylene separator disposed between the positive electrode and the negative electrode is expected to have a function that the separator softens or melts to close holes thereon and release or confine a non-aqueous electrolyte contained therein to decrease its ion conductivity, and thereby reducing the short-circuit current.

But a separator away from the heating part does not always melt. Also, when a temperature further rises, the separator melts and is fluidized, and thereby the function to electrically insulate the positive electrode and the negative electrode is lost to cause short-circuit.

Besides, particularly in a lithium ion secondary battery, a negative electrode is formed by applying a slurry comprising a negative electrode active material such as graphite, a binder such as PVDF (poly(vinylidene fluoride)) and a solvent, onto a base material such as a copper foil which forms a collector, and drying it to form a thin film thereof. A positive electrode is also formed by applying a slurry comprising a positive electrode active material such as $LiCoO_2$, a binder and a conductive agent onto a base material such as an aluminum foil which forms a collector to form a thin film thereof in the same manner.

The conductive agent is used to increase an electronic conductivity at a positive electrode when the positive electrode active material has insufficient electronic conductivity. As the conductive agent, there is used carbon black (such as acetylene black) or graphite (such as artificial graphite KS-6 available form LONZA Co., Ltd.).

Such a battery has a problem that when a temperature of the battery increases to at least a temperature that a separator melts and is fluidized due to internal short-circuit or the like as mentioned above, large short-circuit current flows between a positive electrode and a negative electrode at an area where the separator is fluidized, and thus temperature of the battery further increases due to the generation of heat, leading to a further increase of short-circuit current.

Japanese Unexamined Patent Publication No. 338240/1996 discloses a method for adhering an electrode, a separator and the like by using an adhesive agent in order to maintain the contact state of a contact interface between the electrode and the separator, when an aluminum laminate pack is used as a casing material in order to lighten the battery and enhance energy density. However, this method has a problem that when it is attempted to make an adhesive strength larger according to this method, the adhesive agent intrudes into an opening part of the separator to decrease an opening area and a hole diameter of the separator, and thus undesirable discharge load characteristics of a battery are caused.

The present invention has been carried out in order to solve the above problems. The object of the present invention is to provide a battery having an electrode capable of controlling increase of short-circuit current even at temperature rise due to generation of heat and having excellent discharge load characteristics.

DISCLOSURE OF INVENTION

The first battery of the present invention comprises an active material layer having an active material and an electronically conductive material contacted to the active material, and an electrolytic layer jointed with the active material layer, wherein the above electronically conductive material contains an electrically conductive filler and a resin so that resistance can be increased with temperature rise, and wherein the above active material layer and the electrolytic layer are jointed to each other by thermal treatment using the resin of the above electronically conductive material. According to this, the above electronically conductive material contains the electrically conductive filler and the resin to increase resistance thereof with temperature rise, and thus increase of current can be controlled. Furthermore, since the active material layer and the electrolytic layer are jointed to each other by thermal treatment by using the resin of the electronically conductive material, the extra adhesive agent is not needed, discharge load characteristics can be improved and high current can be provided.

The second battery of the present invention is that in the first battery, the resin is a crystalline resin or contains a crystalline resin. According to this, an increasing ratio of resistance with temperature rise (namely, changing ratio of resistance) can be improved by containing the crystalline resin in the resin, and there is obtained a battery capable of rapidly controlling increase of current flowing into the electrode.

The third battery of the present invention is that in the first battery, a melting point of the resin of the electronically conductive material T1 and a thermal treating temperature T2 satisfy T1≧T2. According to this, jointing is possible without changing properties of the electronically conductive material.

The fourth battery of the present invention is that in the first battery, a melting point of the resin is in a range of 90° C. to 160° C. According to this, by using the resin having a melting point in the range of 90° C. to 160° C., the electronically conductive material can increase changing ratio of resistance at about a pre-determined temperature in the range of 90° C. to 160° C., and thus characteristics of battery and safety can be coexistent with each other.

The fifth battery of the present invention is that in the first battery, a thermal treating temperature is in a range of 90° C. to 160° C. According to this, by jointing the electrolytic layer and the active material layer at a temperature in the range of 90° C. to 160° C., contact resistance of the above thermally fused interface can be increased simultaneously at a temperature where resistance of the electronically conductive material is increased.

The sixth battery of the present invention is that 0.5 to 15 parts by weight of the electronically conductive material is contained in 100 parts by weight of the active material. According to this, by using a battery containing 0.5 to 15 parts by weight of the electronically conductive material in 100 parts by weight of the active material, it is possible to lower resistance of the electrode before changing ratio of resistance of the battery is increased, and jointing strength suitable for battery production and battery performance can be provided.

The seventh battery of the present invention is that in the first battery, an amount of the electrically conductive filler is 40 to 70 parts by weight in the electronically conductive material. According to this, by setting the amount of the electrically conductive filler to 40 to 70 parts by weight in the electronically conductive material, it is possible that changing ratio of resistance with temperature rise is increased while normal resistance is low, and that discharging capacitance of the battery is increased.

The eighth battery of the present invention is that in the first battery, the electronically conductive material has a particle size of 0.05 $\mu$m to 100 $\mu$m. According to this, by using the electronically conductive material having a particle size of 0.05 $\mu$m to 100 $\mu$m, there is obtained desirable normal resistance and discharging capacitance when the electrode is applied to the battery.

The ninth battery of the present invention is that a carbon material or an electrically conductive non-oxide is used as the electrically conductive filler. According to this, since the carbon material or the electrically conductive non-oxide is used as the electrically conductive filler, the electric conductivity of the electrode can be improved.

The tenth battery of the present invention is that in the first battery, the active material layer contains a conductive agent. According to this, since the electrode contains the conductive agent, resistance of the electrode can be suitably controlled even when the electronically conductive material having a small electronic conductivity is used.

The first process for preparing a battery of the present invention comprises the steps of:

(a) forming fine particles of the electronically conductive material by pulverizing an electronically conductive material comprising an electrically conductive filler and a resin;

(b) preparing a paste active material by dispersing the above fine particles of the electronically conductive material and an active material in a dispersion medium;

(c) forming an electrode by drying the above active material paste and by pressing it at a predetermined temperature T1 and a predetermined pressure; and (d) layering the above electrode and the electrolytic layer and fusing it at a predetermined temperature T2 and a predetermined pressure.

According to this method, since it comprises the steps (a) to (d), the adhesion between the electronically conductive material and the active material becomes high, and thus resistance of the prepared electrode or resistance of interface between the electrode and the electrolytic layer can be decreased.

The second process for preparing a battery of the present invention is that in the first method, the resin is a crystalline resin or contains the crystalline resin. According to this, by containing the crystalline resin in the resin, a rate of increase in resistance to temperature rise (namely, changing ratio of resistance) can be improved, and there is obtained a battery capable of rapidly controlling increase of current flowing into the electrode.

The third process for preparing a battery of the present invention is that in the first method, predetermined temperatures T1 and T2 are a melting point of the resin or a temperature near the melting point. According to this, by setting the predetermined temperatures to the melting point of the resin or the temperature near the melting point, the adhesion between the electronically conductive material and the active material is further improved, and thus resistance of the prepared electrode or resistance of interface between the electrode and the electrolyte maintaining layer can be further decreased.

BEST MODE FOR CARRYING OUT THE INVENTION

Figure 1:
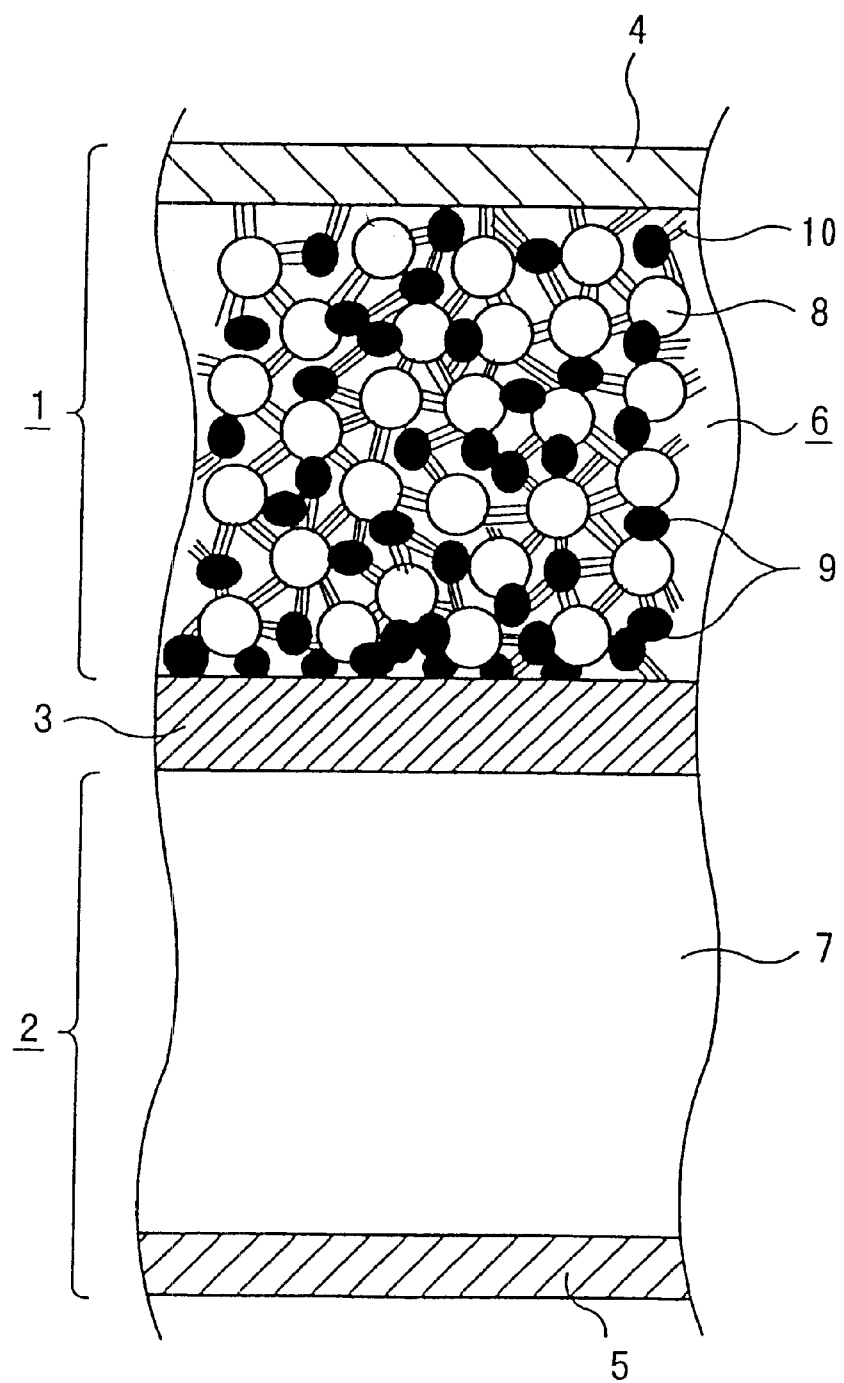
FIG. 1 is a typical sectional view illustrating structure of the battery of the present invention.

FIG. 1 is a sectional view illustrating the battery of the present invention, in particular, a longitudinal sectional view of the battery. In the figure, numeral 1 indicates a positive electrode in which a positive electrode active material layer 6 is formed on the surface of a positive electrode current collector 4; numeral 2 indicates a negative electrode in which a negative electrode active material layer 7 is formed on the surface of a negative electrode current collector 5; and numeral 3 indicates an electrolytic layer such as a separator which is provided between the positive electrode 1 and the negative electrode 2, and the separator 3 holds an electrolytic solution containing lithium ion or the like. Furthermore, in a solid electrolyte type lithium battery, a solid polymer having ionic conductivity is used, while in an electrolyte type lithium battery, there is used a gel solid polymer having ionic conductivity.

The positive electrode active material layer 6 is obtained by bonding a positive electrode active material 8 and an electronically conductive material 9 with a binder 10 to mold it on the surface of the positive electrode current collector 4. The electronically conductive material 9 comprises an electrically conductive filler and a resin or a crystalline resin, and has property that changing ratio of resistance against temperature is increased with temperature rise (hereinafter, the property is referred to as PTC (Positive Temperature Coefficient)).

The positive electrode active material 8 comprises particles. The electronically conductive material 9 is particles having a smaller size than that of the positive electrode active material 8. The size of the positive electrode active material 8 is preferably 0.05 $\mu$m to 100 $\mu$m, and the shape may be a fibrous or flaky small piece. Namely, the shape of the electronically conductive material 9 may be any shape having such a size that the electronically conductive material 9 can be disposed among the adjoining positive electrode active material 8.

The electronically conductive material 9 is jointed with the separator 3 by heating and melting it during thermal treatment.

In order to improve PTC properties (namely, to increase changing ratio of resistance), it is preferable that the resin is a crystalline resin or contains a crystalline resin.

The electronically conductive material 9 has a property that the changing ratio of resistance is increased in a temperature range of, for example, 90° to 160° C.

The PTC function is revealed because the resistance of the electronically conductive material 9 itself is increased due to softening, melting and volume expansion of the resin or the crystalline resin contained in the electronically conductive material 9.

Furthermore, since the electrode and the separator are thermally fused by using the resin in the electronically conductive material without additional adhesive agent, it is possible to decrease obstacles for ionic conduction to improve discharge load characteristics of the battery regardless of a battery reaction on the joint interface between the electrode and the separator. Furthermore, overcurrent can be controlled because of peeling of the joint interface and increase in resistance at the joint interface due to softening and fusion of the resin or the crystalline resin with temperature rise.

As the electrically conductive filler, there can be used a carbon material, an electrically conductive non-oxide or the like. Examples of the carbon material are carbon black such as acetylene black, furnace black, or lamp black; graphite; carbon fiber; and the like. Examples of the electrically conductive non-oxide are a metal carbide, a metal nitride, a metal silicide, a metal boride and the like. Examples of the metal carbide are TiC, ZrC, VC, NbC, TaC, $Mo_2C$, WC, $B_4C$, $Cr_3C_2$ and the like. Examples of the metal nitride are TiN, ZrN, VN, NbN, TaN, $Cr_2N$ and the like. Examples of the metal boride are $TiB_2$, $ZrB_2$, $NbB_2$, $TaB_2$, CrB, MoB, WB and the like.

Moreover, the resin and the crystalline resin mean a polymer such as a high density polyethylene (having a melting point of 130° C. to 140° C.), a low density polyethylene (having a melting point of 110° C. to 112° C.), a polyurethane elastomer (having a melting point of 140° C. to 160° C.) or poly(vinyl chloride) (having a melting point of about 145° C.), whose melting points are in the range of 90° C. to 160° C.

In the electronically conductive material 9, a temperature of PTC expression depends on the melting point of a resin or a crystalline resin contained in the electronically conductive material 9. Thus, the temperature of PTC expression can be controlled in a range of 90° C. and 160° C. by changing a material of the resin mentioned above.

PTC property may be a reversible property that resistance is returned to the original resistance when the temperature is lowered after expression of the PTC property, or may be irreversible property.

Though a temperature of POC expression is preferably at most 90° C. from the viewpoint of guarantee of safety, resistance at the electrode is increased at a temperature range in which a battery is usually used, and thus the battery performance such as discharge load characteristics is lowered.

Also, when a temperature of PTC expression is more than 160° C., the inside temperature of the battery is increased to this temperature, which is not preferable from the viewpoint of guarantee of safety. Therefore, in the electronically conductive material 9, it is desirable to set the temperature of PTC expression in a range of 90° C. to 160° C.

Since the temperature of PTC expression depends on the melting point of the resin or the crystalline resin, the resin or the crystalline resin having melting point of 90° C. to 160° C. is selected.

Also, in a usual condition, i.e. before PTC property is expressed, the resistance of the electrode can be adjusted by controlling an amount of the electronically conductive material 9 in the all positive electrode active material layer 6. And 0.5 to 15 parts by weight of the electronically conductive material 9 is preferably contained in 100 parts by weight of the active material.

An amount of the electrically conductive filler in the electronically conductive material 9 is preferably 40 to 70 parts by weight from the view point of increasing changing ratio of resistance at the electrode with temperature rise, lowering resistance in a usual condition and of increasing the discharging capacitance of the battery.

As the positive electrode active material 8, it is possible to use a composite oxide of lithium and a transition metal such as cobalt, manganese or nickel; a chalcogen compound containing lithium; a composite compound thereof; a material having various additional elements added to the above composite oxide, chalcogen compound or composite compound; and various materials depending upon the sort of the battery.

The negative electrode active material layer 7 is obtained by forming a material obtained by bonding a negative electrode active material such as carbon particles with a binder and by molding it on the surface of the negative electrode collector 5 comprising a metal film (a copper film, for example). As the negative electrode active material used for forming the negative electrode active material layer 7, it is possible to use a material such as a carbon material, through which lithium ions can pass and various materials depending upon the sort of the battery.

As the positive electrode collector 2 and the negative electrode collector 5, any metal stable in the battery can be used. As the positive electrode collector 2, aluminum can be preferably used, while as the negative electrode collector 5, copper can be preferably used. As shape of each collector 2 and 5, any of foil, mesh, and expanded metal and the like can be used. Among those, shape having a large surface area such as mesh and expanded metal is preferable from the view point to provide a joint strength to the active material layer 3 or 6 and to easily impregnate the layer with an electrolytic solution after jointing.

As a material used for the separator 3, there can be used a material such as an insulating porous film, mesh or non-woven fabric to which an electrolytic solution can be impregnated, and which can provide a sufficient strength. Alternatively, in place of the separator 3, there can be used a solid polymer electrolyte, a gel electrolyte or the like having ionic conductivity. As the separator, a porous film comprising polypropylene, polyethylene or the like is preferably used from the viewpoint of guarantee of adhesion and safety. When a fluorine-containing resin is used, it is sometimes necessary to plasma-treat the surface to guarantee of adhesion.

In case of an organic electrolyte type lithium battery, as the electrolytic solution, there can be used solutions comprising a single or mixed solvent of an ether such as dimethoxyethane, diethoxyethane, dimethyl ether or diethyl ether or of an ester such as ethylene carbonate or propylene carbonate in which an electrolyte such as $LiPF_6$, $LiClO_4$, $LiBF_4$, $LiCF_3SO_3$, $LiN(CF_3SO_2)_2$ or $LiC(CF_3SO_2)_3$ is dissolved, or various electrolytic solutions depending on the sort of the battery.

In the positive electrode 1 as shown in FIG. 1, the electronically conductive material 9 itself contained in the positive electrode active material layer 6 has PTC properties, and thus when a temperature of the positive electrode 1 becomes higher than the temperature of PTC expression, the resistance of the positive electrode active material layer 6 is increased and resistance of the interface between the positive electrode 1 and the electrolyte layer is increased.

Therefore, when an electrode (which is herein applied to a positive electrode) having such properties is applied to the battery, and in case where current is increased due to short-circuit outside or inside the electrode of the battery and a temperature of the electrode or the battery is increased to at least a temperature of some value, resistance of the positive electrode active material layer 6 itself is increased and interface resistance is increased, and thereby current flowing inside the battery is controlled.

Therefore, when the battery is formed by using this electrode, there are advantageous effects that safety of the battery is remarkably improved and that the safety of the battery is maintained even in a unusual situation such as short-circuit, reversible charge or overcharge.

FIG. 1 illustrates the positive electrode active material layer 6 comprising the positive electrode active material 8, the electronically conductive material 9 and the binder 10 as an example, but it is not limited thereto. For example, when using such a material that the positive electrode active material 8 contained in the positive electrode active material layer 6 has low electronic conductivity, an additional conductive agent is added to the positive electrode active material layer 6 to supplement the low electronic conductivity.

There is disclosed a construction of the positive electrode 1, in particular, that of the electronically conductive material comprising the electrically conductive filler and the resin or the crystalline resin. However, it is not limited thereto, and a similar effect is seen even when the above construction is applied to the negative electrode 2 to form a battery.

Hereinafter, there is explained processes for preparing the positive electrode 1 and the negative electrode 2 as shown in FIG. 1, and a battery using the positive electrode 1 and the negative electrode 2.
(Process for Preparing Positive Electrode)

A pellet was prepared by mixing, in a predetermined ratio, an electronically conductive material, for example, fine particles of the electrically conductive filler and a resin or a crystalline resin, having sufficiently low volume specific resistance at a room temperature and high volume specific resistance at a temperature higher than a predetermined temperature of 90° C. to 160° C. Then, the pellet was finely pulverized to obtain fine particles of the electronically conductive material.

As a process for pulverizing the electronically conductive material, it is preferable to use compressed air or a compressed inert gas such as nitrogen or argon. In particular, in case of downsizing the particle size, the above inert gas is used to generate an ultrasonic air flow and the particles of the electronically conductive material are collided with each other or with wall surface (not shown in the figure) in the air flow to obtain an electronically conductive material having a smaller particle size (hereinafter, the method for preparing fine particles thereby is referred to as Jet Mill method). Moreover, a pulverization method in a liquid can be also used. In this case, the step of drying after pulverization is required.

Also, if the particle size of the fine particles of the electronically conductive material need not to be too small, there may be used a process for rotating the electronically conductive material in a ball mill for pulverization instead of using compressed air (this method for preparing fine particles is referred to as Ball Mill method.)

Then, the fine particles of the electronically conductive material, the positive electrode active material (such as $LiCoO_2$), and the binder (such as PVDF) are dispersed in a dispersion medium such as N-methylpyrolidone (hereinafter referred to as "NMP") to prepare a paste for the positive electrode active material.

Next, the above paste for the positive electrode active material is applied onto the current collector base material (such as a metal film having a predetermined thickness), which forms the positive electrode current collector 4.

Furthermore, after drying it, pressing is effected at a predetermined temperature with a predetermined surface pressure and the positive electrode active material layer 6 having a desirable thickness is formed to obtain the positive electrode 1.

According to the above-mentioned process for preparing the positive electrode 1, since the pressing is effected at a predetermined temperature with a predetermined surface pressure, adhesion between the electronically conductive material 9 and the active material (herein, positive electrode active material 8) is improved and resistance of the electrode in a usual condition can be lowered.

That is, by controlling the temperature and the pressure (herein, surface pressure), resistance of the prepared electrode can be adjusted. In particular, when the predetermined temperature is set to the melting point or about the melting point of the resin or the crystalline resin contained in the electronically conductive material, adhesion between the electronically conductive material 9 and the active material 8 is further improved and resistance of the electrode in a usual condition can be further lowered.

Herein, there has been illustrated a case where the positive electrode active material paste is pressed at the predetermined temperature with the predetermined surface pressure. However, the positive electrode 1 may be obtained by heating the positive electrode active material paste at a predetermined temperature (preferably, the melting point or a temperature near the melting point) after pressing the paste at a predetermined surface pressure.

Hereinafter, a method of thermal fusing is explained.
(Method of Thermal Fusing)

The positive electrode 1 prepared in the above method and a porous polyethylene sheet are thermally fused by hot roll pressing. A temperature for the thermal fusing is set to 90° C. to 160° C. A press pressure is varied depending upon the sort of the resin, for example, a line pressure of 50 kg/cm. The polyethylene sheet may be thermally fused simultaneously during the hot-press in the above process for preparing the positive electrode 1. Alternatively, the polyethylene sheet and the negative electrode are previously jointed, and the positive electrode 1 may be thermally fused thereon. When a temperature for thermal fusing is excessively high, characteristics of the electronically conductive material 9 can be changed, and thus the temperature need to be near or at most the melting point of the resin comprising the electronically conductive material 9.

Hereinafter, a process for preparing the negative electrode 2 is explained.
(Process for Preparing Negative Electrode)

A negative electrode active material such as MCMB and a paste for negative electrode active material prepared by dispersing PVDF in NMP are applied onto a negative electrode current collector comprising a metal film having a predetermined thickness to obtain the negative electrode 2 having the negative electrode active material layer 7.

Hereinafter, a process for preparing the battery is explained.
(Process for Preparing Battery)

The positive electrode to which the separator formed by the above method is fused and the negative electrode are laminated together to obtain a battery body comprising the positive electrode and the negative electrode. In the battery body according to this method, safety of the battery itself is improved, since increase of short-circuit current can be controlled even when short-circuit happens outside or inside the electrode in the battery body and a temperature of the battery body is increased due to increase in resistance of the positive electrode and resistance of the interface between the positive electrode and the separator with temperature rise.

The electronically conductive material was contained in the positive electrode 1 in the above preparation process, but the electronically conductive material may be contained in the negative electrode 2, and moreover, the electronically conductive material may be contained in both the positive electrode 1 and the negative electrode 2.

Hereinafter, more concrete examples of the present invention are illustrated. However, the present invention is not intended to be limited to these examples.

EXAMPLE 1

(Process for Preparing Positive Electrode)

Pellets of an electronically conductive material (comprising a mixture of 60 parts by weight of carbon black in the form of fine particles and 40 parts by weight of polyethylene) having volume specific resistance of 0.2 $\Omega\cdot$cm at a room temperature and volume specific resistance of 20 $\Omega\cdot$cm at a temperature of 135° C. were finely pulverized according to Jet Mill method to obtain fine particles of the electronically conductive material.

Then, 6 parts by weight of the electronically conductive material in the form of fine particles, 91 parts by weight of a positive electrode active material ($LiCoO_2$) and 3 parts by weight of a binder (PVDF) were dispersed in NMP as a dispersion medium to obtain a paste for positive electrode active material.

Then, the above positive electrode active material paste was applied onto the positive electrode current collector 4 comprising a metal film (herein an aluminum foil) having a thickness of 20 $\mu$m according to Doctor Blade method. Furthermore, it was dried at a temperature of 80° C., and was pressed at a room temperature with a surface pressure of 2 ton/cm$^2$ to form a positive electrode active material layer 6 having a thickness of approximately 100 $\mu$m to obtain the positive electrode 1.

(Method of Thermal Fusing)

The positive electrode 1 and a polyethylene sheet (available from ASAHI CHEMICAL INDUSTRY CO., LTD.; HIGHPORE 6022) were thermally fused by using a hot roll. The temperature for thermal fusing was 105° C. Press pressure was set to 50 kg/cm as a linear pressure. This temperature and this pressure condition are not limited thereto, and can be changed by selecting combination. However, a temperature higher than the melting point of the above electronically conductive material (approximately 110° C. to 140° C. in case of polyethylene) is not preferable from the viewpoint of the performance of the battery, and fusing strength cannot be obtained at an excessively low temperature, which means that there is a proper range for the temperature.

(Process for Preparing Negative Electrode)

A paste for the negative electrode active material was prepared by dispersing 90 parts by weight of MCMB and 10 parts by weight of PVDF in NMP. The paste was applied onto a negative electrode current collector comprising a copper foil having a thickness of 20 $\mu$m according to Doctor Blade method to form the negative electrode 2 comprising the negative electrode active material layer 7.

(Process for Preparing Battery)

The positive electrode and the negative electrode prepared by the above process were laminated together to obtain a battery body having the positive electrode and the negative electrode.

(Evaluation of Electrodes and Battery)

In order to evaluate electrodes and a battery of the present invention, the following manners were employed:
(Measurement of Electrode Resistance)

Aluminum foil was fused on the both surfaces of the electrodes, wherein a plus-side voltage terminal and a plus-side current terminal were connected onto one side of the surfaces of one aluminum foil, while minus-side terminals were connected onto the other aluminum foil. A heater is connected to the terminals, and by increasing a temperature of the electrode at a ratio of 5° C./min, voltage drop of the device through which a constant current was flowed was measured, and thus resistance (herein volume specific resistance ($\Omega\cdot$cm)) was measured.

(Capacitance Test)

The positive and negative electrodes, to which the separator 3 was thermally fused, were cut into a part having size of 14 mm×14 mm, and were laminated to each other, and then a current collector terminals were mounted onto each of the positive electrode and the negative electrode of the battery body by spot welding. It was placed into a bag made of an aluminum-laminated sheet, an electrolytic solution was put thereinto, and the bag was sealed to obtain a battery. A charge-discharge test for this battery was carried out at a room temperature.

(Short-Circuit Test)

The positive and negative electrodes, to which the separator 3 was thermally fused, were cut into a part having size of 14 mm×14 mm, and were laminated to each other. The current collector terminals, mounted to each edge of the positive and negative electrode current collectors, were connected to each other by spot-welding both at the positive and negative electrodes, and the battery bodies were layered and connected in electrically parallel to form a layered battery body.

The layered battery body was introduced into a bag made of an aluminum-laminated sheet, thereto was added an electrolytic solution which was obtained by dissolving lithium hexafluorophosphate in a mixed solvent of ethylene carbonate and diethyl carbonate (in a molar ratio of 1:1) in a concentration of 1.0 mol/dm$^3$, and thereafter the bag was sealed by thermal fusing to prepare a battery.

This battery was charged at a room temperature to 8.0 mA×4.1 volts. After completion of charging, a temperature of the battery was gradually elevated from a room temperature to a predetermined temperature, and the positive electrode and the negative electrode were short-circuited at the pre-determined temperature to measure the current value thereof.

COMPARATIVE EXAMPLE 1

For comparison, artificial graphite KS-6 (available form LONZA Co., Ltd.) was used as an electronically conductive material. Fine particles of 6 parts by weight of the artificial graphite KS-6, 91 parts by weight of a positive electrode active material (LiCoO$_2$) and 3 parts by weight of a binder (PVDF) were dispersed in NMP as a dispersion medium to prepare a positive electrode active material paste. Then, the positive electrode active material paste was applied onto a metal film (herein an aluminum foil) having a thickness of 20 μm which forms the positive electrode current collector 4 according to the Doctor Blade method. Furthermore, it was dried at 80° C., and was pressed at a surface pressure of 2 ton/cm$^2$ and at a room temperature to form the positive electrode active material layer 6 having a thickness of approximately 100 μm and a positive electrode was obtained. By using this positive electrode, a battery was prepared in the same process for preparing a negative electrode and a battery as in Example 1.

Table 1 shows characteristics of the battery in Example 1, together with those in Comparative Example 1. Specifically, there are shown volume specific resistance of each electrode, rate of change in volume specific resistance and discharging capacitance of each battery. In Table 1, changing ratio of resistance means the value which is obtained by dividing the volume specific resistance after PTC expression by the one before PTC expression.

TABLE 1

| | Volume specific resistance (Ω · cm) | Changing ratio of resistance | Discharging capacitance (mAh) |
| --- | --- | --- | --- |
| Ex. 1 | 120 | 80 | 4.3 |
| Com. Ex. 1 | 60 | 1.1 | 4.3 |

As shown in Table 1, it is found that the changing ratio of resistance is smaller in Comparative Example 1 than that in Example 1 since the electronically conductive material contains no crystalline resin.

In Example 1, the volume specific resistance after PTC expression has increased as eighty times as the one before PTC expression since the crystalline resin was mixed with the electronically conductive material, particularly in the positive electrode active material layer of the positive electrode and was thermally fused with the separator.

Therefore, when a battery is constituted by using this electrode, if a temperature inside the battery becomes higher than the predetermined temperature, the function of PTC is revealed, and furthermore, resistance of the interface between the positive electrode and the separator is increased, and thus increase of short-circuit current is controlled, and safety and reliability of the battery are further improved.

In Example 1, the battery having a changing ratio of resistance of 80 was explained. However, the present invention is not limited thereto, and the above effects can be obtained when the changing ratio of resistance is in the range of approximately 1.5 to 10000.

Figure 2:
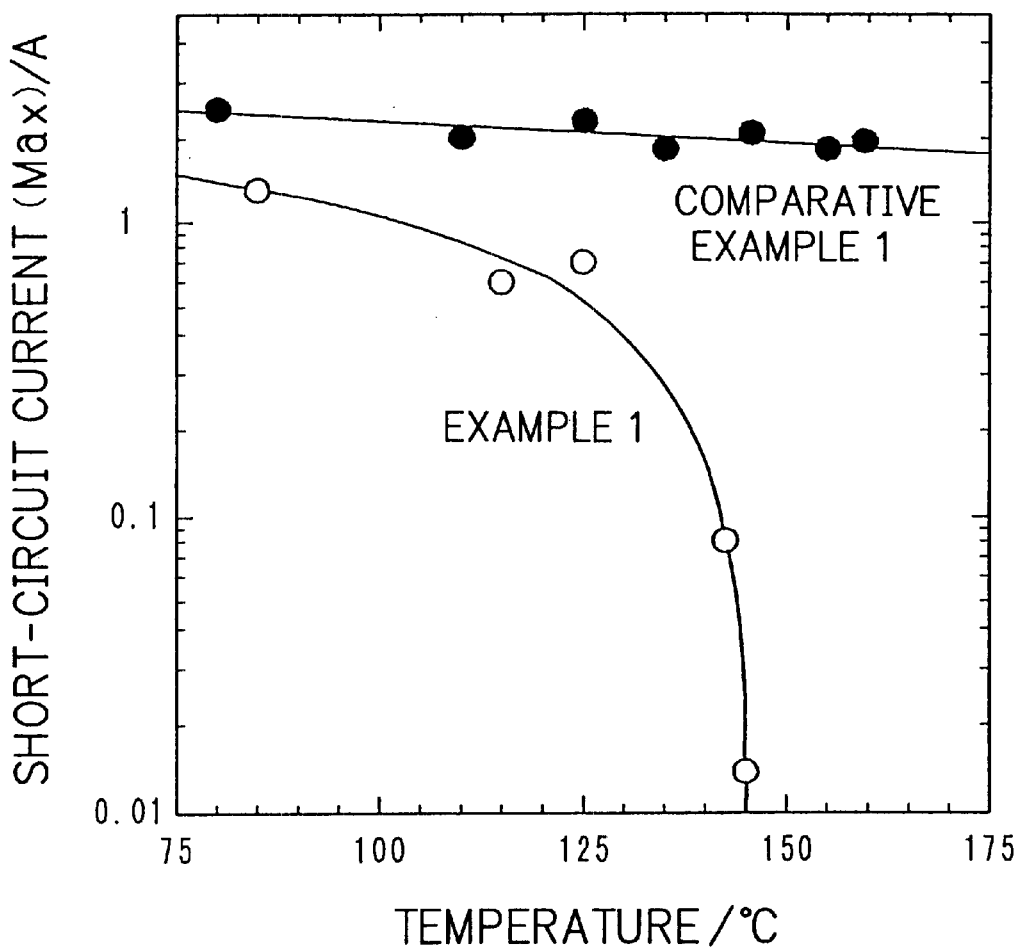
FIG. 2 illustrates the relationship between each temperature and the maximum current in short-circuit current test at each temperature in Example 1.

FIG. 2 illustrates a relationship between each temperature and the value of maximum current in the short-circuit current test for the batteries of Example 1 and Comparative Example 1.

In the battery of Example 1, the value of the maximum short-circuit current in short-circuit test at a temperature of at least 120° C. is smaller than the value at a temperature of at most 120° C. due to PTC expression. However, in the battery of Comparative Example 1, decrease of short-circuit current is not found even when short-circuit was conducted at a temperature of at most 120° C.

Comparing Example 1 with Comparative Example 1, the crystalline resin is mixed particularly with the electronically conductive material of the positive electrode in the electrodes to be thermally fused with the separator in Example 1. Accordingly, when the battery was prepared by using this electrode, the function of PTC is revealed if a temperature inside the battery becomes higher than the predetermined temperature and furthermore resistance of the interface between the positive electrode and the separator becomes higher, and therefore increase of short-circuit current is controlled before a temperature of the battery exceeds 160° C., to further improve safety and reliability of the battery.

COMPARATIVE EXAMPLE 2

As an electronically conductive material 9, pellets of a mixture of 60 parts by weight of carbon black in the form of fine particles and 40 parts by weight of a polypropylene resin (having a melting point of 168° C.) were finely pulverized according to Jet Mill method to obtain fine particles of the electronically conductive material. Then a positive electrode was formed in the same manner as in Example 1 except for the above. By using this positive electrode, a battery was prepared in the same manner as in Example 1.

Figure 3:
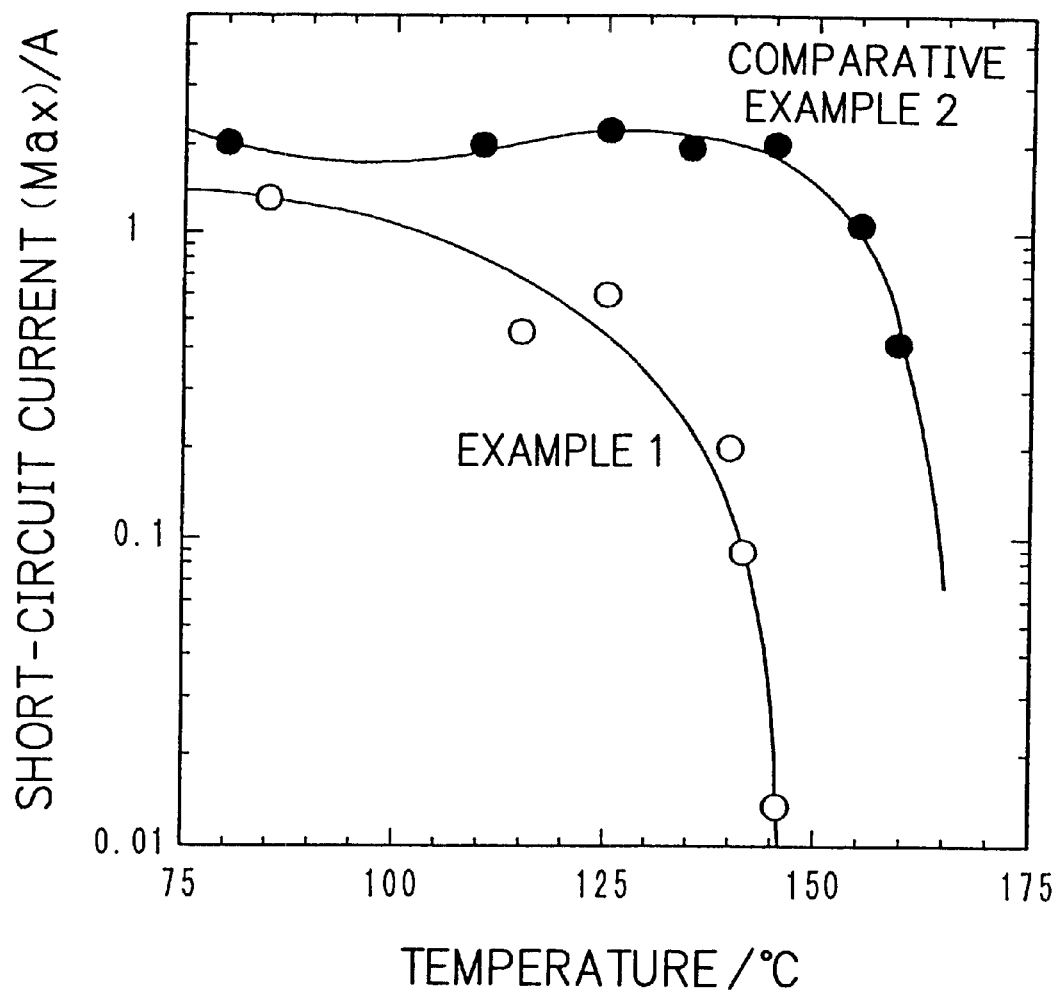
FIG. 3 illustrates the relationship between each temperature and the maximum current in short-circuit current test at each temperature in Example 1.

FIG. 3 illustrates the relationship between each temperature and the value of maximum current in the short-circuit current test for the batteries of Example 1 and Comparative Example 2.

As shown in the figure, the temperature at which the function of PTC was revealed was higher than 160° C. in Comparative Example 2. In this case, the polypropylene resin having a melting point of 168° C. was used as a crystalline resin. Accordingly, when the electrode having the electronically conductive material comprising this crystalline resin was used for the battery, it is thought that a temperature of PTC expression has possibly become higher than 160° C.

On the other hand, in Example 1, polyethylene having a melting point lower than 160° C. was used as the crystalline resin, and thus increase of short-circuit current was controlled before the temperature exceeded 160° C. to further improve safety and reliability of the battery.

In the battery of Example 1, a PTC effect functions at a temperature of at least 120° C. to decrease short-circuit current, while in the battery of Comparative Example 2, a temperature of PTC expression is higher, and decrease of short-circuit current can be confirmed only after the temperature becomes at least 160° C.

This is because the melting point of the crystalline resin (herein polypropylene) contained in the electronically conductive material is higher.

Therefore, if the crystalline resin having a melting point of 90° to 160° C. is selected as the crystalline resin contained in the electronically conductive material 9, the performance of the battery is not decreased, the PTC expression temperature can be lower than 160° C. and furthermore, the interface resistance can be increased at the temperature.

COMPARATIVE EXAMPLE 3

As an electronically conductive material, pellets of a mixture of 38 parts by weight of carbon black and 62 parts by weight of polyethylene were finely pulverized according to Jet Mill method to obtain fine particles of the electronically conductive material. Then a positive electrode was formed in the same manner as in Example 1 except for the above. By using this positive electrode, a battery was prepared in the same manner as in Example 1.

COMPARATIVE EXAMPLE 4

As an electronically conductive material, pellets of a mixture of 71 parts by weight of carbon black and 29 parts by weight of polyethylene were finely pulverized according to Jet Mill method to obtain the fine particles of electronically conductive material. Then a positive electrode was formed in the same manner as in Example 1 except for the above. By using this positive electrode, a battery was prepared in the same manner as in Example 1.

Table 2 shows volume specific resistance of the electrode, changing ratio of resistance with temperature rise, value of discharging capacitance at 2C (C: time rate) of the battery and the maximum short-circuit current value at 140° C., comparing Example 1 with Comparative Examples 3 and 4.

As shown in Table 2, changing ratio of resistance is larger, resistance of the electrode is higher and discharging capacitance is lower in Comparative Example 3 than in Example 1.

Furthermore, discharging capacitance is higher in Comparative Example 4 than in Example 1. However, the PTC function is insufficient due to a high ratio of the carbon black, and thus decrease of short-circuit current was not found in the short-circuit test.

Therefore, by changing the ratio of the electrically conductive filler contained in the electronically conductive material, changing ratio of resistance of the electrode and discharging capacitance of the battery can be adjusted to a suitable value.

TABLE 2

| | Volume specific resistance ($\Omega \cdot cm$) | Changing ratio of resistance at temperature rise | Discharging capacitance (mAh) | Maximum Short-circuit Current at 140° C. (mA) |
|---|---|---|---|---|
| Ex. 1 | 120 | 80 | 4.3 | 0.20 |
| Com. Ex. 3 | 521 | 112 | 1.1 | 0.15 |
| Com. Ex. 4 | 62 | 1.7 | 4.3 | 2.4 |

In particular, by setting an amount of the electrically conductive filler contained in the electrode to 40 to 70 parts by weight, resistance of the electrode in a usual condition (namely, before PTC expression) can be lowered, changing ratio of resistance of the electrode can be increased, and furthermore, the discharging capacitance can be increased when this electrode is used to constitute a battery.

Moreover, by setting an amount of the electrically conductive filler contained in the battery 50 to 68 parts by weight, characteristics of the electrode and the battery shown in Table 2 can be more preferable.

EXAMPLE 2

Figure 4:
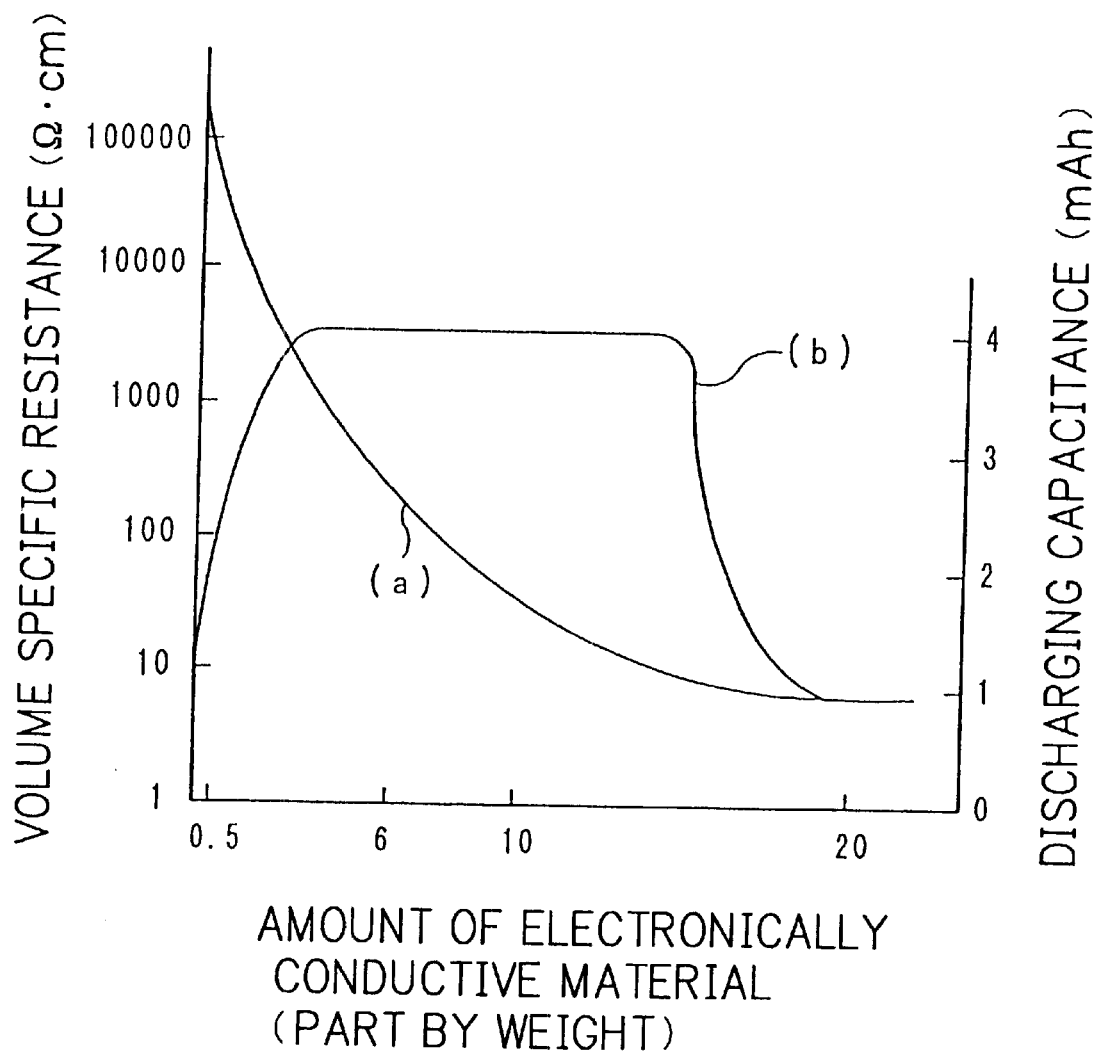
FIG. 4 is a graph showing the relationship between the ratio of an electronically conductive material and the resistance of an electrode and the relationship between the ratio of an electronically conductive material and the discharging capacitance thereof in Example 2.

The ratio of the electronically conductive material in preparation of the positive electrode in Example 1 was varied. FIG. 4 illustrates the relationship between a ratio of the electronically conductive material and volume specific resistance of each electrode and the relationship between a ratio of the electronically conductive material and discharging capacitance. Specifically, FIG. 4 illustrates the relationship between a ratio of the electronically conductive material to 100 parts by weight of the total solid content of the electrode (herein the positive electrode) of the battery and volume specific resistance ((a) in the figure) of each electrode, and the relationship between the ratio of the electronically conductive material to 100 parts by weight of the total solid content of the electrode (herein the positive electrode) of the battery and discharging capacitance ((b) in the figure).

As shown in FIG. 4, when at most 0.5 part by weight of the electronically conductive material is used, usual resistance of the electrode becomes excessively high, discharging capacitance becomes small and thus, there are problems in battery performance. On the other hand, when at least 15 parts by weight thereof is used, an amount of the active material is decreased, and thereby discharging capacitance is decreased.

Therefore, by setting an amount of the electronically conductive material to 0.5 to 15 parts by weight based on 100 parts by weight of the total solid content of the electrode, usual resistance of the electrode can be lowered and discharging capacitance of the battery using this electrode can be increased. More preferably, by setting to 0.7 to 12 parts by weight, most preferably, 1 to 10 parts by weight, of the electronically conductive material, a further desirable battery can be prepared.

EXAMPLE 3

Figure 5:
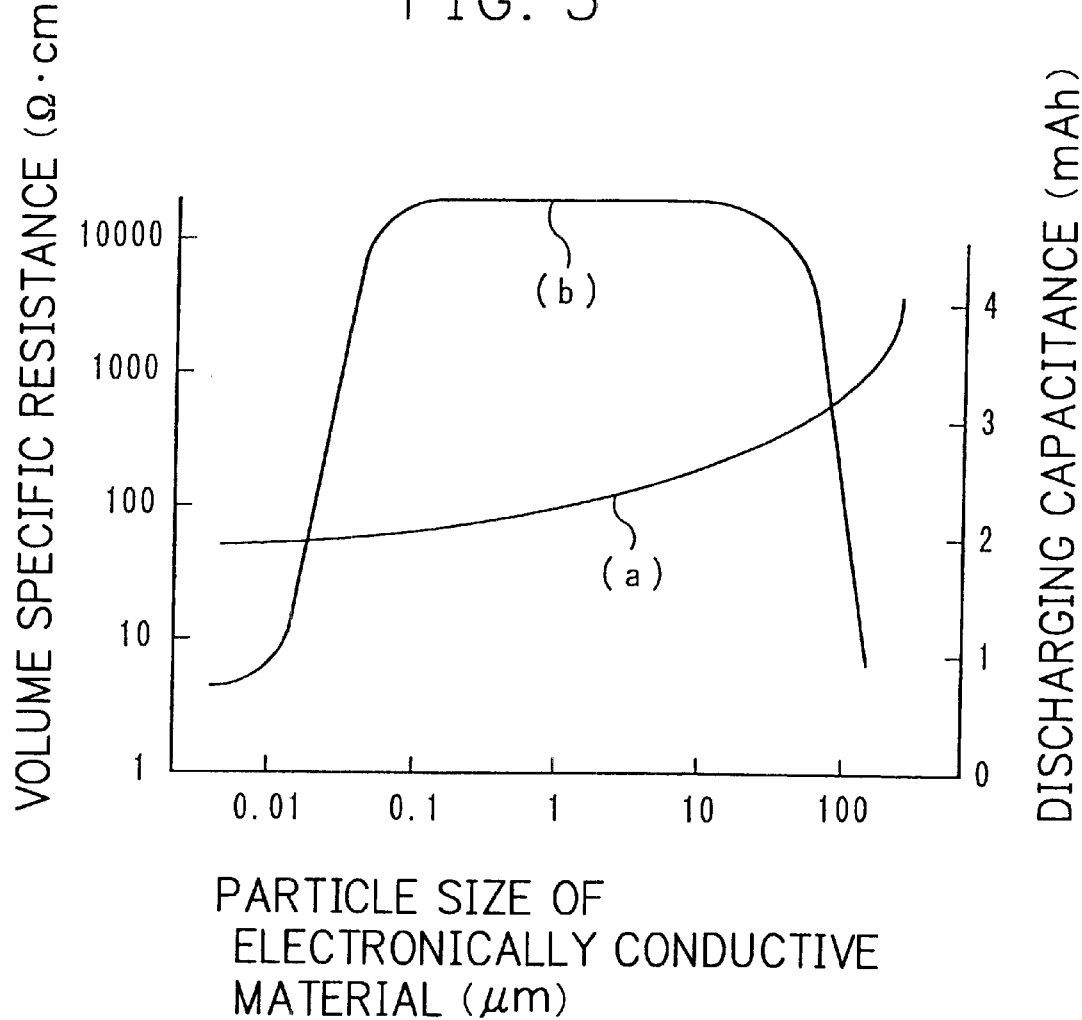
FIG. 5 is a graph showing the relationship between the particle size of an electronically conductive material and the volume specific resistance of an electrode and the relationship between the particle size of an electronically conductive material and the discharging capacitance thereof in Example 3.

Particle size of the electronically conductive material in preparation of the positive electrode in Example 1 was varied. FIG. 5 illustrates the relationship between the particle size of the electronically conductive material and resistance of each electrode ((a) in FIG. 5) and the relationship between the particle size of the electronically conductive material and discharging capacitance ((b) in FIG. 5).

When the particle size of the electronically conductive material is at most 0.05 μm, filling ratio of the electronically conductive material is decreased, which means that volume of the electronically conductive material per a unit volume of the positive electrode active material layer is increased, namely that an amount of the positive electrode active material is decreased. Therefore, when the particle size of the electronically conductive material is at most 0.05 μm, discharging capacitance is decreased. On the other hand, when the particle size of the electronically conductive material is at least 100 μm, resistance of the electrode itself is increased and discharging capacitance is decreased.

Accordingly, by setting the average particle size of the electronically conductive material to 0.05 to 100 μm, usual resistance of the electrode can be lowered and discharging capacitance can be improved. Preferably, by setting the average particle size of the electronically conductive material to 0.1 to 50 μm, more preferably, 0.5 to 20 μm, volume fraction of the electronically conductive material, volume specific resistance of the electrode itself, and discharging capacitance can be further desirably improved.

EXAMPLE 4

Pellets of an electronically conductive material (prepared by mixing 60 parts by weight of carbon black in the form of fine particles and 40 parts by weight of polyethylene) having a volume specific resistance of 0.2 Ω·cm at a room temperature and a volume specific resistance of 20 Ω·cm at 135° C. were finely pulverized by using Ball Mill to obtain fine particles of the electronically conductive material.

By using the fine particles of the electronically conductive material, an electrode (herein a positive electrode) was prepared in the same manner as in Example 1, and furthermore, a battery was prepared in the same manner of preparing the negative electrode and the battery as in Example 1.

Table 3 shows the average particle size of the electronically conductive material, resistance of each electrode, and discharging capacitance.

In this example, since the electronically conductive material was pulverized according to Ball Mill method, the particle size of the obtained electronically conductive material particles become larger. As a result, volume specific resistance is increased and discharging capacitance is decreased, but the battery can be used in practice.

TABLE 3

|  | Average particle size of electronically conductive material (μm) | Volume specific resistance (Ω · cm) | Discharging Capacitance (mAh) |
| --- | --- | --- | --- |
| Ex. 1 | 9.1 | 120 | 4.3 |
| Ex. 4 | 52.3 | 932 | 2.8 |

As the results show, it is found that in order to achieve lower usual resistance of the electrode and higher discharging capacitance of the battery it is preferable to pulverize the electronically conductive material according to Jet Mill method.

EXAMPLE 5

Example 5 is characterized in that in Example 1, the positive electrode active material paste was applied onto an aluminum foil, dried at 80° C., and thereafter pressed at 135° C. with a pressure of 0.5 ton/cm² for 30 minutes to prepare an electrode (herein a positive electrode). In this example, the preparation methods of the negative electrode and the battery are the same as those in Example 1.

Table 4 shows characteristics of the electrode and the battery of Example 5, together with those of Example 1.

TABLE 4

|  | Porosity (%) | Volume specific resistance (Ω · cm) | Discharging capacitance (mAh) |
| --- | --- | --- | --- |
| Ex. 1 | 30 | 120 | 4.3 |
| Ex. 5 | 25 | 87 | 4.3 |

As shown in Table 4, since the dried positive electrode active material paste was pressed at a temperature near the melting point of the crystalline resin contained in the electronically conductive material in this example, adhesion between the electronically conductive material and the active material is improved. Therefore, resistance of the electrode in a usual condition can be controlled to a low value.

This means that by controlling the temperature or the pressure (herein surface pressure) in pressing the dried positive electrode active material paste, the resistance of the prepared electrode can be controlled.

In particular, by setting the temperature of pressing the dried positive electrode active material paste to the melting point or near the melting point of the crystalline resin contained in the electronically conductive material, volume specific resistance of the prepared electrode in a usual condition can be small even if the pressure is lowered to some extent since the paste is pressed at a temperature near the melting point of the crystalline resin.

EXAMPLE 6

(Process for Preparing Positive Electrode)

Pellets of an electronically conductive material (prepared by mixing carbon black and polyethylene in a predetermined ratio) having volume specific resistance of 0.2 Ω·cm at a room temperature and volume specific resistance of 500 Ω·cm at an operating temperature of 135° C. were finely pulverized according to Jet Mill to obtain fine particles having an average particle size of 9.0 μm.

A mixture of 4.5 parts by weight of the fine particles of the electronically conductive material, 1.5 parts by weight of artificial graphite KS-6 (available from LONZA Co., Ltd.) as a conductive agent, 91 parts by weight of an active material (LiCoO₂) and 3 parts by weight of a binder (PVDF) was dispersed in NMP as a dispersion medium to obtain a positive electrode active material paste.

Then, the above positive electrode active material paste was applied onto the positive electrode current collector 4 comprising a metal film (herein an aluminum foil) having a thickness of 20 μm according to Doctor Blade method. Furthermore, it was dried at 80° C., pressed at a predetermined temperature (for example, at a room temperature) with a predetermined surface pressure (of 2 ton/cm²) to form a positive electrode active material layer 6 having a thickness of approximately 100 μm to prepare the positive electrode 1. Then, the positive electrode 1 and a polyethylene sheet (available from Asahi Chemical Industry Co., Ltd.; HIGHPORE 6022) were thermally fused by using a hot roll heated to 105° C. Preparation methods of a negative electrode and a battery are the same as in Example 1.

Table 5 shows characteristics of the electrode and the battery of Example 6 and those of Example 1. Specifically, there are shown volume specific resistance, changing ratio of resistance and discharging capacitance of each electrode.

As compared with Example 1, both the resistance and the changing ratio of resistance of the electrode in Example 6 show almost similar value as in Example 1.

Namely, even if an electronically conductive material having high volume specific resistance is used, volume specific resistance of the electrode in a usual condition can be lowered and discharging capacitance can be improved by adding a conductive agent.

TABLE 5

|       | Volume specific resistance (Ω · cm) | Discharging capacitance (mAh) | Maximum short-circuit current at 140° C. (mA) |
|-------|-------------------------------------|-------------------------------|----------------------------------------------|
| Ex. 1 | 120                                 | 4.3                           | 0.20                                         |
| Ex. 6 | 81                                  | 4.3                           | 0.25                                         |

COMPARATIVE EXAMPLE 5

A positive electrode 1 and a negative electrode were prepared in the same manner as in Example 6. Then, the positive electrode 1 and the negative electrode were thermally fused by using fine particles of polyethylene. In this case, fusion strength was increased, but discharge load characteristics of the battery became worse. This is because an excessive amount of polyethylene necessary for thermal fusion was incorporated into the interface between the separator and the electrode ionic conduction was inhibited. As a result, it is found that fusing should be conducted preferably by using the resin contained in the active material layer in terms of battery performance.

EXAMPLE 7

(Process for Preparing Positive Electrode)

Pellets of an electronically conductive material (prepared by mixing carbon black and polyethylene in a predetermined ratio) having volume specific resistance of 0.2 Ω·cm at a room temperature and volume specific resistance of 500 Ω·cm at an operating temperature of 135° C. were finely pulverized by using Jet Mill to obtain fine particles having an average particle size of 9.0 μm.

A mixture of 4.5 parts by weight of the fine particles of the electronically conductive material, 1.5 parts by weight of artificial graphite KS-6 (available from LONZA Co., Ltd.) as a conductive agent, 91 parts by weight of an active material (LiCoO$_2$), and 3 parts by weight of a binder (PVDF) was dispersed in NMP as a dispersion medium to obtain a positive electrode active material paste.

Then, the above positive electrode active material paste was applied onto a metal film having a thickness of 20 μm and which forms the positive electrode current corrector 4 (herein an aluminum foil) according to Doctor Blade method. Then, it was dried at 80° C., pressed at a predetermined temperature (for example, at a room temperature) with a predetermined surface pressure (of 2 ton/cm$^2$) to form the positive electrode active material layer 6 having a thickness of approximately 100 μm and the positive electrode 1 was obtained. Also, the positive electrode 1 and a polyethylene sheet (available form Asahi Chemical Industry Co., Ltd.; HIGHPORE 6022) were thermally fused by using a hot roll heated to a temperature of T2. Preparation methods of a negative electrode and a battery are the same as in Example 2.

Table 6 shows temperatures, pressures and state of fusion in the hot roll press and characteristics of the battery of this example.

TABLE 6

| Temperature (° C.) | Pressure (kg/cm) | State of fusion | Battery characteristics |
|--------------------|------------------|-----------------|------------------------|
| 60                 | 50               | x               | x                      |
| 80                 | 50               | O               | O                      |
| 100                | 25               | Δ               | Δ                      |
|                    | 50               | O               | O                      |
| 105                | 25               | O               | O                      |
|                    | 50               | O               | O                      |
|                    | 100              | O               | O                      |
|                    | 200              | O               | O                      |
|                    | 400              | x               | x                      |
| 110                | 25               | O               | Δ                      |
|                    | 50               | O               | Δ                      |
| 120                | 25               | O               | Δ                      |

The state of fusion shows fusion strength and a degree of fusion of the separator.

O: Excellent

Δ: Joint strength is weak.

x: Joint is impossible or separator becomes transparent.

The characteristics of a battery show discharging capacitance.

O: Excellent

Δ: Capacitance ratio is 70%.

x: Capacitance ratio is at most 50%.

As shown in Table 6, it is found that the state of fusion and the characteristics of a battery differ depending upon a combination of the temperature and the pressure. They are not excellent at a temperature of at most 60° C. regardless of the pressure. They are not good at a temperature of at least 110° C. especially with a pressure of at least 50 kg/cm. In this case, a temperature of about 105° C. with a pressure of at most 200 kg/cm is preferable. The above condition is applicable to a polyethylene separator (available from Asahi Chemical Industry CO., LTD.; HIGHPORE 6022), and in case of using the other separators of the other raw material such as a porous film including powdered ceramics, condition of temperature and pressure is different.

Herein, as the conductive agent, graphite (herein artificial graphite KS-6 (available from LONZA Co., Ltd.)) was used. However, the agent is not limited thereto. The conductive agent may be any material having no PTC function but having a function of improving electric conductivity of the positive electrode active material layer, for example, carbon black such as acetylene black or lump black.

Additionally, the electrode and the battery shown in the above examples can be used not only for a lithium secondary battery of an organic electrolytic solution type, a solid electrolytic type, and a gel electrolytic type, but also for a primary battery such as a lithium/manganese dioxide battery or for another secondary battery.

Furthermore, the above electrode and the battery are useful for an aqueous-solution primary and secondary battery. These electrode and battery can be further used for a primary and secondary battery of laminated type, winding type, button type and the like.

Figure 6:
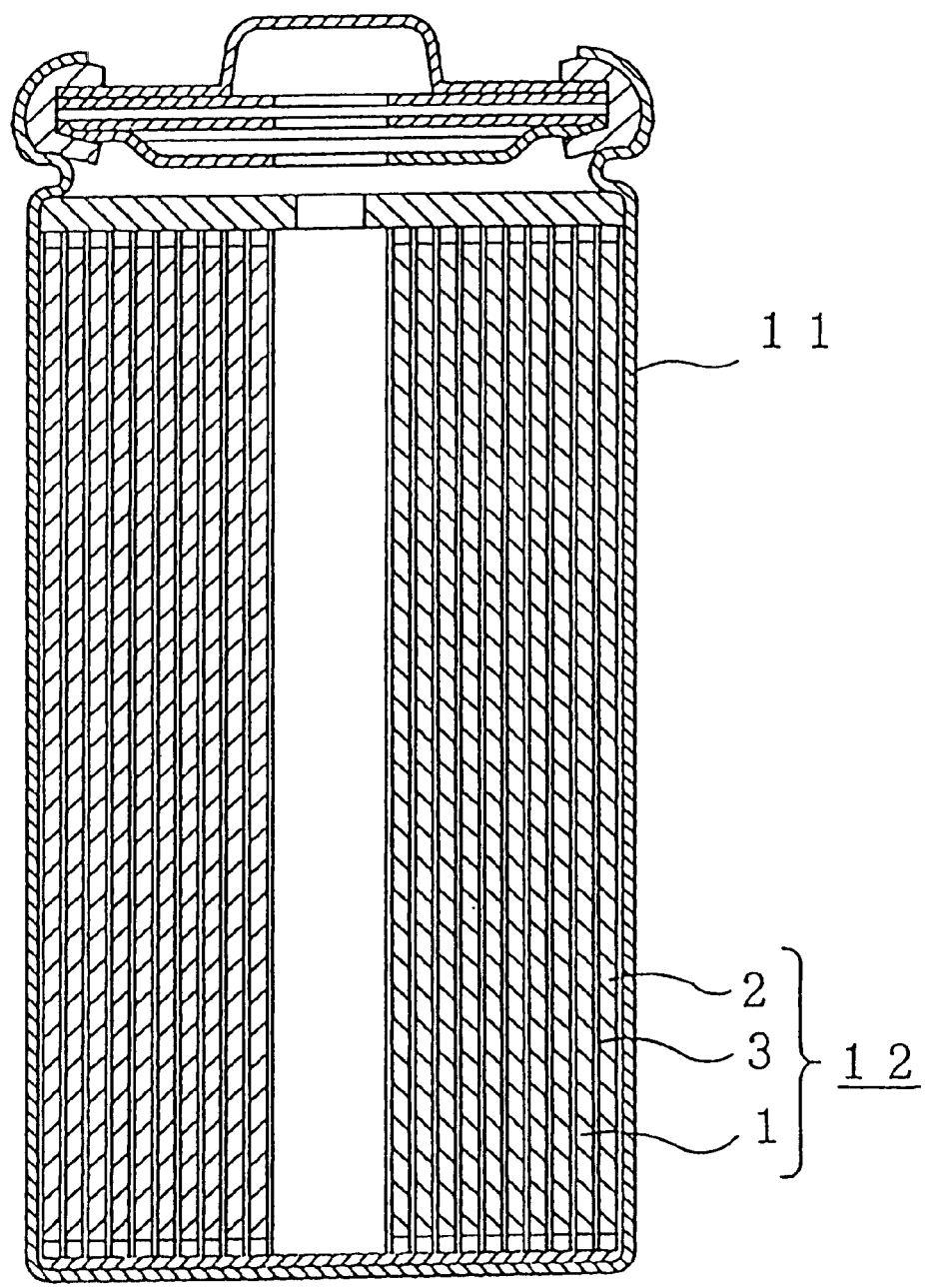
FIG. 6 illustrates one embodiment of a cylindrical battery.

FIG. 6 is a typical cross sectional view illustrating a structure of a cylindrical lithium ion secondary battery, wherein numeral 11 indicates an outer can made of stainless or the like, which also functions as a negative terminal; numeral 12 indicates a battery body contained inside the outer can 11. The battery body 12 has such a structure that a positive electrode 1, a separator 3 and a negative electrode 2 are wound in a spiral shape, and the positive electrode 1 of the battery body 12 has the structure of any electrode described in Examples 1 to 6.

Also, the structure may be such that the negative electrode active material layer of the negative electrode 2 has the electronically conductive material containing the crystalline resin and the electrically conductive filler.

INDUSTRIAL APPLICABILITY

The battery and the process for preparing the same of the present invention can be applied not only to a lithium ion secondary battery of an organic electrolytic solution type, a solid electrolyte type, and a gel electrolyte type, but also to a primary battery such as a lithium/manganese dioxide battery or another secondary battery.

Furthermore, the battery and the process for preparing the same of the present invention can be applied also to an aqueous-solution primary and secondary battery and a primary and secondary battery of a laminated type, a winding type, a button type and the like.

What is claimed is:

1. A battery comprising:
    an active material layer having an active material and an electronically conductive material contacted to the active material and an electrolytic layer jointed with the active material layer, wherein
        the electronically conductive material has a positive temperature coefficient and comprises an electrically conductive filler and a resin having a predetermined resin melting temperature T1, and
        the active material layer and the electrolytic layer are jointed and fused to each other by heating the resin to a predetermined thermal treatment temperature T2.

2. A battery according to claim 1, wherein the resin is a crystalline resin or contains a crystalline resin.

3. A battery according to claim 1, wherein
    the predetermined resin melting temperature T1 is greater than or equal to the predetermined thermal treatment temperature T2.

4. A battery according to claim 1, wherein
    the predetermined resin melting temperature T1 is in the range of 90° C. to 160° C.

5. A battery according to claim 1, wherein
    the predetermined thermal treatment temperature T2 is in the range of 90° C. to 160° C.

6. A battery according to claim 1, wherein 0.5 to 15 parts by weight of the electronically conductive material is contained in 100 parts by weight of the active material.

7. A battery according to claim 1, wherein an amount of the electrically conductive filler is 40 to 70 parts by weight in the electronically conductive material.

8. A battery according to claim 1, wherein
    the electronically conductive material comprises particles having a particle size of 0.05 $\mu$m to 100 $\mu$m.

9. A battery according to claim 1, wherein
    the electrically conductive filler comprises one of a carbon material and an electrically conductive non-oxide.

10. A battery according to claim 1, wherein the active material layer contains a conductive agent.

* * * * *